(12) United States Patent
Besting et al.

(10) Patent No.: US 11,524,272 B2
(45) Date of Patent: Dec. 13, 2022

(54) ADSORBENT AND PACKAGING MATERIAL

(71) Applicant: Clariant International Ltd, Muttenz (CH)

(72) Inventors: Hubertus Besting, Deggendorf (DE); Gabriele Hölzl, Nandlstadt (DE); Alexander Mayerhofer, Nandlstadt (DE); Friedrich Ruf, Tiefenbach (DE)

(73) Assignee: Clariant International Ltd, Muttenz (CH)

( * ) Notice: Subject to any disclaimer, the term of this patent is extended or adjusted under 35 U.S.C. 154(b) by 500 days.

(21) Appl. No.: 16/495,689

(22) PCT Filed: Mar. 14, 2018

(86) PCT No.: PCT/EP2018/056451
§ 371 (c)(1),
(2) Date: Sep. 19, 2019

(87) PCT Pub. No.: WO2018/177754
PCT Pub. Date: Oct. 4, 2018

(65) Prior Publication Data
US 2020/0094218 A1  Mar. 26, 2020

(30) Foreign Application Priority Data
Mar. 31, 2017  (EP) .................................... 17164159

(51) Int. Cl.
| | | |
|---|---|---|
| *B01J 20/12* | (2006.01) | |
| *B01J 20/16* | (2006.01) | |
| *B01J 20/22* | (2006.01) | |
| *B01J 20/28* | (2006.01) | |
| *B32B 29/08* | (2006.01) | |
| *D21H 27/10* | (2006.01) | |
| *D21H 27/40* | (2006.01) | |

(52) U.S. Cl.
CPC ............... *B01J 20/12* (2013.01); *B01J 20/16* (2013.01); *B01J 20/22* (2013.01); *B01J 20/2804* (2013.01); *B01J 20/28057* (2013.01); *B01J 20/28069* (2013.01); *B32B 29/08* (2013.01); *D21H 27/10* (2013.01); *D21H 27/40* (2013.01)

(58) Field of Classification Search
CPC ... B01J 20/12; B01J 20/16; B01J 20/22; B01J 20/2804; B01J 20/28057; B01J 20/28069; B32B 29/08; D21H 27/10; D21H 27/40
USPC .......................................................... 502/31
See application file for complete search history.

(56) References Cited

U.S. PATENT DOCUMENTS

| | | | |
|---|---|---|---|
| 6,315,816 B1 | 11/2001 | Cho et al. | |
| 2014/0096487 A1 | 4/2014 | Nolsen et al. | |
| 2019/0301096 A1* | 10/2019 | Braschi | D21C 5/02 |

FOREIGN PATENT DOCUMENTS

| | | |
|---|---|---|
| EP | 0564947 A1 | 10/1993 |
| WO | 2010141581 A1 | 12/2010 |

OTHER PUBLICATIONS

Inge Daems et al., "Molecular Cage Nestling in the Liquid-Phase Adsorption of n-Alkanes in 5A Zeolite", Journal of physical Chemistry C. vol. 111, No. 5 Jan. 17, 2007, pp. 2191-2197, XP055735630, US ISSN: 1932-7447.
Qu Ziqing, Wu Weizhong "Adsorption-Magnetic Separation Process for Oily Wastewater Treatment", Acta Scientiae Circumstantiae, vol. 7, No. 1, Mar. 1987.
Barrett, E.P. et al., "The Determination of Pore Volume and Area Distributions in Porous Substances. I. Computations from Nitrogen Isotherms", J. Am. Chem. Soc, (1951), vol. 73, p. 373.
European Food Safety Authority, "Scientific Opinion on Mineral Oil Hydrocarbons in Food", EFSA Journal 2012, 185 pages.
Vollmer, A. et al., "Migration of mineral oil from printed paperboard into dry foods: survey of the German market", European Food Research and Technology, (2011), vol. 232, No. 1 , pp. 175-182.

* cited by examiner

Primary Examiner — Edward M Johnson
(74) Attorney, Agent, or Firm — Verrill Dana, LLP

(57) ABSTRACT

The present invention relates to an adsorbent suitable for the adsorption of MOAH and/or MOSH compounds, the use of the adsorbent for the production of a packaging material or a container comprising the adsorbent, the process of production of the packaging material or container as well as the respective packaging material and container.

14 Claims, 1 Drawing Sheet

ADSORBENT AND PACKAGING MATERIAL

The present invention relates to an adsorbent suitable for the adsorption of MOAH and/or MOSH compounds, the use of the adsorbent for the production of a packaging material or a container comprising the adsorbent, the process of production of the packaging material or container as well as the respective packaging material and container.

In the manufacture of cardboard from recycled paper, newsprint paper is used as one of the raw materials. Most of the conventionally used newspaper inks contain mineral oils. Since they cannot be removed in the recycling process to a sufficient degree, they are found in food packaging made of recycled cardboard. Other possible contamination pathways are lubricants from food processing plants, exhausts of harvesting machines or mineral oils, which are used as lubricants or release agents during manufacturing or packaging processes. The detected mineral oil mixtures consist of saturated and aromatic hydrocarbons.

Saturated hydrocarbons are open-chain and ring-shaped saturated hydrocarbons (MOSH). The abbreviation MOSH stands for "mineral oil saturated hydrocarbons". Aromatic hydrocarbons are known as MOAH, i.e. "mineral oil aromatic hydrocarbons". MOAHs consist of a complex mixture of predominantly alkylated aromatic hydrocarbons.

Contamination of food with mineral oils from packaging is especially likely in the case of dry foods with a large surface such as flour, semolina, rice, breadcrumbs and breakfast cereals (European Food Research and Technology Vol. 232, Number 1, 175-182). However, MOSH and MOAH compounds have also been found in other food products such as chocolate.

Short-chain saturated hydrocarbons (MOSH) are absorbed by the body and can be deposited and accumulate in some organs. From animal experimental studies it is known that such mineral oil mixtures can lead to accumulation in and damage to the liver and lymph nodes (EFSA Journal 2012; 10(6):2704). The precise composition of the substance mixtures in print colours, especially the fraction that contains aromatic hydrocarbons (MOAH), is unknown. The complex mixture of predominantly alkylated aromatic hydrocarbons that constitutes the MOAH fraction includes carcinogenic substances.

One way to prevent MOSH and MOAH contamination of food products would be the use of virgin fiber-based paper or cardboard, however, this is not desirable in view of a sustainable management of natural resources. Another option would be the use of mineral oil-free printing colours, which would considerably increase production costs of the initial paper/cardboard material and might also require general regulations by legislature.

A third option is the implementation of functional barriers in the structure of the packaging. So far functional barrier structures in form of an internal bag consisting of aluminium, polyethylene terephthalate (PET), metallised or coated polymer films or multilayer films containing a polyamide or ethylene vinyl alcohol layer have been tested. It has been found that aluminium and suitable plastic based bags keep the migration below the detection limit of 0.2-0.5 mg/kg food (EFSA Journal 2012; 10(6):2704), however, the implementation of this form of additional packaging considerably increases production costs and is undesirable for environmental reasons. In addition, some of the internal bags did not function as an efficient barrier until the end of the shelf life of the respective food product.

Within the DE 10 2011 105761 activated carbon is integrated into the cardboard and functions as a filter material to prevent active migration of the MOSH and MOAH compounds into the food product. A major drawback of activated carbon is the high risk of dust explosion and combustibility, which requires elaborate and costly safety provisions. In addition, activated carbon leads to a blackening and thus discoloration of the packaging material and limits recycling options.

Therefore, there is a need for a material which is inexpensive and can easily be integrated into the packaging material but which also shows excellent and long-term barrier function to MOSH and MOAH compounds.

The inventors of the present invention have therefore set themselves the task to develop a material which can be integrated in packaging material to reduce or even avoid migration of MOSH and MOAH compounds into the food product. This task is achieved by an adsorbent suitable for the adsorption of MOAH and/or MOSH compounds characterized by (i) a specific surface area of from 140 to 700 $m^2/g$; and/or (ii) a pore volume of pores from 20 to 500 Å of from 0.1 to 1.2 ml/g; and/or (iii) a total pore volume of from 0.25 to 1.2 ml/g.

The inventive material further provides the benefit that it can be easily integrated into standard paper and cardboard production processes without a major increase of production costs and provides excellent recycling opportunities.

Within the present invention, the term "adsorbent suitable for the adsorption of MOAH and/or MOSH compounds" (in the following also referred to as "adsorbent" or "adsorbents") pertains to any substance capable to reversible or irreversible bind such compounds. Further "adsorbent suitable for the adsorption of MOAH and/or MOSH compounds" refers to any substance capable of adhesion of atoms, ions, or molecules from a gas, liquid, or dissolved solid to its surface. Adsorption is a surface-based process. Within a preferred embodiment of the invention, the adsorbent is selected from the group consisting of bentonites, attapulgites, saponites, sepiolites, mixed layer saponites/kerolites, natural and synthetic aluminum silicates and mixtures thereof.

Within another preferred embodiment the adsorbent is an acid-activated adsorbent. The process of acid-activation is well known to a person skilled in the art and is preferably carried out by contacting the adsorbent with HCl, $H_2SO_4$ or organic acids such as citric acid, particularly preferred by spraying an aqueous solution of 3 to 5 weight-% acid onto the adsorbent.

Within the present invention compounds referred to as "MOSH" are open-chain and ring-shaped saturated hydrocarbons (MOSH) and comprise paraffines and naphthenes. Compounds referred to as "MOAH" comprise any compound known to a person skilled in the art as alkylated aromatic hydrocarbons. They either originate directly from mineral oil or from hydration of aromatic compounds during raffination processes.

Within the present invention the term and determination method "specific surface area" has been specified in example 1. Any adsorbent characterized by a specific surface area of from 140 to 700 $m^2/g$ is to be understood as an adsorbent suitable for the adsorption of MOAH and/or MOSH compounds according to the present invention, wherein a specific surface area of from 180 to 650 is preferred, a specific surface area of from 190 to 630 $m^2/g$ is particularly preferred, further preferred is a specific surface area of from 200 to 600 $m^2/g$ wherein a specific surface area of from 210 to 550 $m^2/g$ is most preferred.

Within the present invention the term and determination method "pore volume of pores from 20 to 500 Å" has been specified in example 1. Any adsorbent characterized by a pore volume of pores from 20 to 500 Å of from 0.10 to 1.20 ml/g is to be understood as an adsorbent suitable for the adsorption of MOAH and/or MOSH compounds according to the present invention, wherein a a pore volume of pores from 20 to 500 Å of from 0.20 to 1.20 ml/g is preferred, a pore volume of pores from 20 to 500 Å of from 0.22 to 1.15 ml/g is particularly preferred, further preferred is a pore volume of pores from 20 to 500 Å of from 0.24 to 1.10 ml/g or a pore volume of pores from 20 to 500 Å of from 0.24 to 1.00 ml/g wherein a pore volume of pores from 20 to 500 Å of from 0.24 to 0.90 ml/g is most preferred.

Within the present invention the term and determination method "total pore volume" has been specified in example 1. Any adsorbent characterized by a total pore volume of from 0.25 to 1.20 ml/g is to be understood as an adsorbent suitable for the adsorption of MOAH and/or MOSH compounds according to the present invention, wherein a total pore volume of from 0.25 to 1.10 ml/g is preferred, a total pore volume of from 0.30 to 1.00 ml/g is particularly preferred, further preferred is a total pore volume of from 0.35 to 0.98 ml/g or a total pore volume of from 0.40 to 0.90 ml/g wherein a total pore volume of from 0.40 to 0.80 ml/g is most preferred.

Preferred adsorbents are characterized by a specific surface area of from 140 to 700 $m^2/g$, a pore volume of pores from 20 to 500 Å of from 0.10 to 1.20 ml/g and a total pore volume of from 0.25 to 1.20 ml/g.

More preferred are adsorbents characterized by a specific surface area of from 180 to 650 $m^2/g$, a pore volume of pores from 20 to 500 Å of from 0.20 to 1.20 ml/g and a total pore volume of from 0.25 to 1.10 ml/g.

Particularly preferred are adsorbents characterized by a specific surface area of from 190 to 630 $m^2/g$, a pore volume of pores from 20 to 500 Å of from 0.22 to 1.15 ml/g and a total pore volume of from 0.25 to 1.10 ml/g.

Further preferred are adsorbents characterized by a specific surface area of from 200 to 600 $m^2/g$, a pore volume of pores from 20 to 500 Å of from 0.22 to 1.15 ml/g and a total pore volume of from 0.25 to 1.10 ml/g.

Also preferred are adsorbents characterized by a specific surface area of from 200 to 600 $m^2/g$, a pore volume of pores from 20 to 500 Å of from 0.24 to 1.10 ml/g and a total pore volume of from 0.25 to 1.10 ml/g.

Even more preferred are adsorbents characterized by a specific surface area of from 210 to 550 $m^2/g$, a pore volume of pores from 20 to 500 Å of from 0.22 to 1.15 ml/g and a total pore volume of from 0.25 to 1.10 ml/g.

Most preferred are adsorbents characterized by a specific surface area of from 210 to 550 $m^2/g$, a pore volume of pores from 20 to 500 Å of from 0.22 to 1.15 ml/g and a total pore volume of from 0.30 to 1.00 ml/g.

Within the present invention the term and determination method "wet sieve residue" has been specified in example 1. Any adsorbent characterized by a wet sieve residue of from 90 to 100% less than 53 µm is to be understood as an adsorbent suitable for the adsorption of MOAH and/or MOSH compounds, wherein a wet sieve residue of from 95 to 100% less than 53 µm is preferred and from 98 to 100% less than 53 µm is most preferred. Further preferred is a wet sieve residue of from 95 to 100% less than 45 µm and particularly preferred of from 95 to 100% less than 25 µm.

Within the present invention the term and determination method "water content" has been specified in example 1. Any adsorbent characterized by a water content of from 5 to 30 wt.-% is to be understood as an adsorbent suitable for the adsorption of MOAH and/or MOSH compounds, wherein a water content of from 8 to 25 wt.-% is preferred µm and water content of from 10 to 20 wt.-% is most preferred.

Within the present invention the term and determination method "swelling capacity" has been specified in example 1. Any adsorbent characterized by a swelling capacity of less than 15 ml/2 g is to be understood as an adsorbent suitable for the adsorption of MOAH and/or MOSH compounds. Preferred is a swelling capacity of less than 10 ml/2 g.

Another aspect of the present invention pertains to a packaging material comprising at least one adsorbent as defined within the present application. The term "packaging material" is known to a person skilled in the art and refers to any material suitable of enclosing or protecting products for distribution, storage, sale and use. Within the present invention the term "packaging material" refers in particular to any paper, liner board, paperboard or cardboard or corrugated cardboard material suitable for the production of containers and wrappings for food products. Particularly for the production of wrapping and containers for dry food products.

Within the present invention, the term "paper" refers to a thin material produced by pressing together moist fibers of cellulose pulp derived from wood, rags or grasses, and drying them into flexible sheets.

Within the present invention "cardboard" (or "paperboard") is a thick paper-based material with according to ISO standards a grammage above 224 $g/m^2$.

Within a preferred embodiment of the present invention, the packaging material is a multilayer material and comprises at least two layers of material, preferably from 2 to 10 layers, further preferred of from 2 to 8 layers and most preferred of from 2 to 5 layers of cardboard, paperboard and/or paper material. The packaging material may further comprise layers and/or coatings of a different material such as aluminum or plastics or wax material. Within a particularly preferred embodiment the packaging material comprises at least one layer comprising the adsorbent as defined within the present application and at least one layer made of or comprising recycled or non-recycled paper, recycled or non-recycled paperboard or recycled or non-recycled cardboard material.

Within a particularly preferred embodiment, the layer comprising the at least one adsorbent comprises from 1 to 25 wt.-% of the at least one adsorbent, preferably of from 2 to 20 wt.-%, further preferred of from 5 to 16 wt.-% and most preferred of from 6 to 15 wt.-% (relative to the weight of the fiber material).

Within another particularly preferred embodiment, the packaging material comprises at least one layer wherein the at least one layer comprises the recycled paper and/or cardboard material and the at least one adsorbent as defined within the present invention.

Within another preferred embodiment, the layer comprising the at least one adsorbent comprises from 0.001 to 3 wt.-% of a retention agent. Within the present invention the term "retention agent" refers to any substance added in the wet end of the paper machine to improve the retention of fibers, fine particles and fillers during the formation of paper. Retention agents can also be used to improve the retention of other papermaking chemicals, including sizing agents and starches. Typical chemicals used as retention agents are polyacrylamide (PAM), polyethyleneimine (PEI) and poly-dadmac. It is favorable to reduce the amount of retention agent needed as many of these compounds negatively affect the environment and they also contribute to the overall production costs of the packaging material. It is a further benefit of the inventive adsorbent that—despite the high surface area—the amount of retention agent needed to guarantee smooth production and high quality paper or paperboard material can be kept at a constant level and was not increased. The use of the retention agent can therefore be limited to from 0.001 to 3 wt.-% or to from 0.001 to 2 wt.-% and even of from 0.01 to 1.5 wt.-% (relative to the weight of the fiber and adsorbent material).

A further aspect of the present invention pertains to a container comprising the packaging material as defined within the present application.

Within a preferred embodiment, the at least one layer of the packaging material comprising the at least one adsorbent is positioned between the inside of the container and the at least one layer comprising the recycled paper and/or the at least one adsorbent and recycled paper are located in the same layer.

Within another preferred embodiment, the container is a container for food or feed products, preferably dry food products such as but not limited to noodles, flour, starch or leguminous vegetables, dried dairy products or sweets such as chocolate.

Another aspect of the present invention pertains to the use of the inventive adsorbent for the manufacture of a packaging material as defined within the present application or a container as defined within the present application.

Another aspect of the present invention pertains to a process for the production of a packaging material comprising the steps
 (a) Providing a slurry of fibrous material and water;
 (b) Adding of from 1 to 25 wt.-% of at least one adsorbent as defined in any of claims 1 to 6;
 (c) Draining the slurry;
 (d) Drying the drained slurry.

The term "slurry" as used within the present invention is therefore to be understood as comprising any composition comprising at least one component in liquid form and comprising from 0.01 to 40 wt.-% of at least one solid. Within a preferred embodiment, the at least one adsorbent is added in form of a slurry with a solid content of from 15 to 35 wt.-% at a Brookfield-viscosity at 100 rpm of around 1000 mPas. The "addition" can be carried out according to any method known to a person skilled in the art as suitable for the inventive purpose.

The term "draining" as used within the present invention is to be understood as comprising any method known to a person skilled in the art as suitable for the inventive process such as drainage by use of geotextiles or sieves.

The term "drying" as used within the present invention is to be understood as comprising any method known to a person skilled in the art as suitable for the inventive process such as drying by use of heated or drying cylinders.

In the following particularly preferred embodiments of the inventive process are described which are not to be understood as limiting the invention in any respect. It is to be understood that irrespective of the following particularly preferred embodiments any combination of the features as defined before is within the scope of the present invention.

Particularly Preferred Embodiment 1

Adsorbent suitable for the adsorption of MOAH and/or MOSH compounds characterized by
 (i) a specific surface area of from 180 to 650 m$^2$/g; and/or
 (ii) a pore volume of pores from 20 to 500 Å of from 0.20 to 1.20 ml/g; and/or
 (iii) a total pore volume of from 0.25 to 1.10 ml/g.

Particularly Preferred Embodiment 2

Adsorbent suitable for the adsorption of MOAH and/or MOSH compounds characterized by
 (i) a specific surface area of from 180 to 650 m$^2$/g; and/or
 (ii) a pore volume of pores from 20 to 500 Å of from 0.20 to 1.20 ml/g; and/or
 (iii) a total pore volume of from 0.25 to 1.10 ml/g,
 further characterized by a wet sieve residue of from 90 to 100% less than 53 μm, a water content of from 5 to 30 wt.-% and by a swelling capacity of less than 15 ml/2 g.

Particularly Preferred Embodiment 3

Adsorbent suitable for the adsorption of MOAH and/or MOSH compounds characterized by
 (i) a specific surface area of from 210 to 550 m$^2$/g; and/or
 (ii) a pore volume of pores from 20 to 500 Å of from 0.22 to 1.15 ml/g; and/or
 (iii) a total pore volume of from 0.25 to 1.10 ml/g,
 further characterized by a wet sieve residue of from 90 to 100% less than 53 μm, a water content of from 5 to 30 wt.-% and by a swelling capacity of less than 15 ml/

Particularly Preferred Embodiment 4

Adsorbent suitable for the adsorption of MOAH and/or MOSH compounds characterized by
 (i) a specific surface area of from 190 to 630 m$^2$/g; and/or
 (ii) a pore volume of pores from 20 to 500 Å of from 0.22 to 1.15 ml/g; and/or
 (iii) a total pore volume of from 0.35 to 0.98 ml/g,
 further characterized by a wet sieve residue of from 90 to 100% less than 53 μm, a water content of from 5 to 30 wt.-% and by a swelling capacity of less than 15 ml/2 g.

Particularly Preferred Embodiment 5

Packaging material comprising at least one layer wherein the at least one layer comprises the recycled paper and/or cardboard material and the at least one adsorbent as defined in any of particularly preferred embodiments 1, 2, 3 or 4.

Particularly Preferred Embodiment 6

Packaging material comprising at least two layers of cardboard material and/or paper wherein at least one of the layers comprises at least one adsorbent as defined in any of particularly preferred embodiments 1, 2, 3 or 4 and at least one layer comprising recycled paper or cardboard material.

Particularly Preferred Embodiment 7

Packaging material as defined in particularly preferred embodiment 5 or 6, further comprising from 0.001 to 3 wt.-% (relative to the weight of the fiber and adsorbent material) of a retention agent.

Particularly Preferred Embodiment 8

Container comprising the packaging material as defined in particularly preferred embodiment 5, 6 or 7 wherein the at least one layer of the packaging material comprising the at least one adsorbent is positioned between the inside of the container and the at least one layer comprising the recycled paper and/or cardboard material.

Particularly Preferred Embodiment 9

Use of the adsorbent as defined in any of particularly preferred embodiments 1, 2, 3 or 4 for the production of a packaging material as defined in particularly preferred embodiment 5, 6 or 7, or the container as defined in particularly preferred embodiment 8.

Particularly Preferred Embodiment 10

Process for the production of a packaging material comprising the steps
 (a) Providing a slurry of fibrous material and water;
 (b) Adding of from 1 to 25 wt.-% of at least one adsorbent as defined in any of particularly preferred embodiments 1, 2 3 or 4 and from 0.001 to 3 wt.-% (relative to the weight of the fiber and adsorbent material) of a retention agent;

(c) Draining the slurry;

(d) Drying the drained slurry, wherein the at least one adsorbent is added in form of a slurry with a solid content of from 15 to 35 wt.-% at a Brookfield-viscosity at 100 rpm of 1000 mPas.

Examples

The present invention is now described by the following examples and figures. The examples and figures are for illustrative purposes only and are not to be understood as limiting the invention.

LIST OF FIGURES

Figure 1:
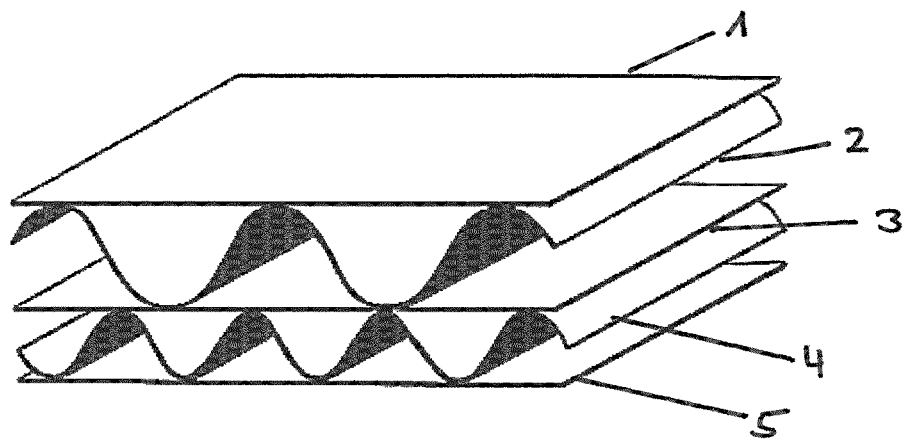
FIG. 1 shows a corrugated cardboard comprising 5 layers ((1), (2), (3), (4), (5)) of cardboard material and one layer (5) with an additional content of inventive adsorbent.
Figure 2:
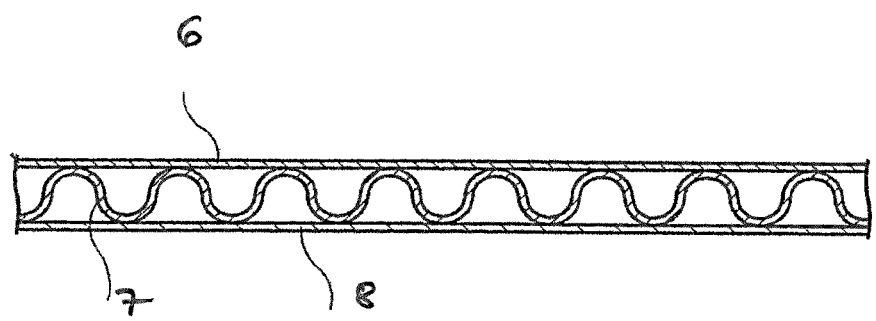
FIG. 2 shows a corrugated cardboard comprising 3 layers ((6), (7), (8)) of cardboard material and one layer (8) with an additional content of inventive adsorbent.
Figure 3:
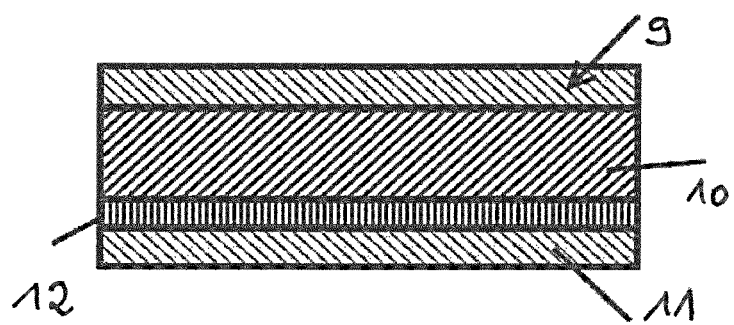
FIG. 3 shows a flat cardboard comprising 4 layers ((9), (10), (11), (12)) of cardboard material and one layer (11) with an additional content of inventive adsorbent.

Example 1: Characterization of Adsorbents and Determination of MOSH and MOAH Adsorbent Capacity Test for the determination of MOSH and MOAH adsorbent capacity was performed as follows:

A migration cell was used consisting of a glass storage vessel for the hydrocarbons which was equipped on top with a fine metal fabric. An additional glass cap allowed a hermetic closure of the migration cell.

The storage vessel served as a reservoir for the synthetic MOSH/MOAH mixture, which consists of a mixture of mineral oils of the companies Gravex, Total and Edwards containing a MOSH/MOAH ratio of 80/20. For the experiments 2.00+/−0.01 g of the hydrocarbon mixture was weighed into the reservoir. The metal fabric was placed on the reservoir and 1.00+/−0.01 g of the adsorbent was distributed evenly on the fabric. The cell was closed with the glass cap and stored under 60° C./atmospheric pressure for 16 hours. Under these conditions the hydrocarbons slowly move in gas form through the fabric and onto the adsorbent.

After the storage time the adsorbent was quantitatively transferred into a glass beaker, 100 ml of n-hexane (n-hexane anhydrous, Sigma-Aldrich) was added and the hydrocarbons were extracted from the adsorbents by shaking the beaker for 2 hours at room temperature. The n-hexane solution was separated from the adsorbent by filtration and the extracts were analyzed according to the method described and published by the German Bundesinstitut für Risikobewertung (BfR) under the title "Bestimmung von Kohlenwasserstoffen aus Mineralöl (MOSH und MOAH) oder Kunststoffen (POSH, PAO) in Verpackungsmaterialien und trockenen Lebensmitteln mittels Festphasenextraktion und GC-FID" on 04.05.2012. The principle of this method is the separation of the extracts over a with silver-nitrate doped silica-gel column into MOSH and MOAH fractions and their quantitative determination with the aid of a gas chromatography/flame ionization detector (GC-FID). The results of the double determinations were recorded in mg MOSH/MOAH per kg adsorbent.

Wet sieve residue at 53 μm was determined as follows:

100 g of oven dry pigment was added under stirring at 930 rpm (Pendraulik LD 50 stirrer) to 1500 g of tap water within 2 minutes. Stirring was continued for 18 minutes at 1865 rpm. The suspension was afterwards transferred on a 53 μm sieve (diameter 200 mm) and washed under gentle knocking by means of flowing tap water until the wash water was clear. Afterwards the sieve was placed in a supersonic bath for 5 minutes in order to destroy pigment agglomerates and washed again with tap water until the wash water was completely clear. The sieve with the residue was dried in a drying cabinet until weight constancy. The residue was transferred by means of a brush on a tray and weighed on an analytical balance. The weight of the residue in grams corresponded to its percentage.

Water content was determined as follows:

10 g of the adsorbent was weighed onto an aluminum tray and dried for 90 minutes at 130° C. in a drying cabinet to constant weight. The sample was cooled in a desiccator to room temperature and the weight was measured on an analytical balance.

Water content in %=weight before drying—weight after drying×10

Specific surface area was determined as follows:

Specific surface was measured by the BET-method (single-point method using nitrogen, according to DIN 66131) with an automatic nitrogenporosimeter of Micrometrics, type ASAP 2020.

Pore volume was determined as follows:

The pore volume was determined in an ASAP 2020 (Accelerated Surface Area and Porosimetry System) of Micromeritics according to the BJH-method (E. P. Barett, L. G. Joyner, P. P. Hienda, J. Am. Chem. Soc. 73 (1951) 373), which uses nitrogen gas at the temperature of liquid nitrogen (−196° C.) and increasing partial nitrogen pressure to cover the surface and to fill the pores of the pigment/adsorbent. Before measurement, the sample (0.5 to 1.0 g) was completely degased by heating it in a sample tube to 250° C. under vacuum for 20 hours. After cooling down to room temperature, the tube including the sample was weighed (for the exact determination of the sample weight) and inserted in the analyzer. After cooling with liquid nitrogen to −196° C. the flushing with nitrogen gas was started whereas the partial pressure P/Po was increased in steps until close to 1 to guarantee that all pores were filled with nitrogen. The software of the system recorded over decreasing pore diameter ranges (2500 to about 10 Angstroem Å) the corresponding incremental pore volumes in $cm^3/g$. These incremental values were added up to the total pore volume of the sample. The pore volume of the mesopores were calculated by adding up the incremental pore volumes between the pore diameters of 500 and 20 Å. An average pore diameter in Angstroem was calculated according to BJH.

Swelling capacity was determined as follows:

A graduated 100 ml measuring cylinder was filled with 100 ml distilled water. 2.0 g of the pigment were added slowly in small portions of 0.1 to 0.2 g by means of a spatula. After each addition it was waited until the pigment sank to the bottom of the cylinder, than the procedure was continued. After termination of the addition, the pigment was allowed to swell for 1 hour—then the volume of the swollen pigment in ml was recorded. The swelling volume (1 h) was documented in ml/2 g.

For testing purposes, all adsorbents were adjusted to wet sieve residues of below 2% at 53 μm and to water contents of 8 to 12%. Adsorbents according to the invention (No. 4 to 9) provide higher specific surface area and total pore volume than the comparative examples 1 to 3.

Table 1 shows a comparison of adsorbents according to the present invention (No 4 to 9) and adsorbents of the state of the art (No 1 to 3) in view of the measured parameters (see above).

TABLE 1

Characterization of Adsorbent

| No. | Adsorbent | Spec. surface area m²/g | Pore volume ml/g | | | | % meso | Average pore diameter Å |
| --- | --- | --- | --- | --- | --- | --- | --- | --- |
|     |     |     | total | micro | meso | macro |     |     |
| 1 | Ca-bentonite (Montmorillonite) | 73 | 0.094 | 0.011 | 0.055 | 0.028 | 59 | 50 |
| 2 | Saponite | 138 | 0.179 | 0.024 | 0.122 | 0.033 | 68 | 51 |
| 3 | Attapulgite | 102 | 0.248 | 0.007 | 0.185 | 0.056 | 75 | 94 |
| 4 | Bentonite, acid act. | 236 | 0.342 | 0.016 | 0.288 | 0.038 | 84 | 60 |
| 5 | nat. silica | 244 | 0.643 | 0.015 | 0.512 | 0.116 | 80 | 100 |
| 6 | Sepiolite | 190 | 0.410 | 0.020 | 0.248 | 0.142 | 60 | 80 |
| 7 | Sepiolite, acid act. | 218 | 0.270 | 0.024 | 0.220 | 0.025 | 81 | 50 |
| 8 | Saponite/Kerolite mixed layer | 231 | 0.252 | 0.015 | 0.182 | 0.055 | 72 | 47 |
| 9 | Al-silicate synthetic | 506 | 0.985 | 0 | 0.856 | 0.129 | 87 | 73 |
| 6a | nat. silica | 199.5 | 32.0 | 7.0 | | | | |
| 6b | nat. silica | 201.0 | 39.0 | 14.0 | | | | |
| 7 | Sepiolite | 201.6 | 38.5 | 13.5 | | | | |
| 8 | Sep. acid act. | 198.8 | 39.0 | 14.0 | | | | |
| 9a | Saponite/Kerolite mixed layer | 201.2 | 32.5 | 7.5 | | | | |
| 9b | Saponite/Kerolite mixed layer | 202.3 | 39.5 | 14.5 | | | | |
| 10 | Al-silicate synth. | 200.8 | 39.0 | 14.0 | | | | |

The results of table 2 show that a high mesopore (20 to 500 Å) and total pore volume as well as a high specific surface area are mandatory for the performance of the adsorbent.

TABLE 2

Adsorption of MOSH/MOAH

| Trial no. | Adsorbent | MOSH µg/g ≤C 25 | MOAH µg/g ≤C 25 | Total |
| --- | --- | --- | --- | --- |
| 1 | Ca-bentonite (Montmorillonite) | 380 | 35 | 415 |
| 2 | Saponite | 487 | 34 | 521 |
| 3 | Attapulgite | 465 | 32 | 497 |
| 4 | Bentonite, acid act. | 694 | 54 | 748 |
| 5 | nat. silica | 725 | 50 | 775 |
| 6 | Sepiolite | 740 | 35 | 775 |
| 7 | Sepiolite, acid act. | 804 | 61 | 865 |
| 8 | Saponite/Kerolite mixed layer | 629 | 35 | 672 |
| 9 | Al-silicate synthetic | 820 | 58 | 878 |

Adsorbents according to the present invention show high adsorption of the MOSH/MOAH-fraction<C 25. Given the applied test method predominantly the more volatile hydrocarbons below C 25 are mobilized and thus adsorbed. Consequently, fractions between C 25 and C 35 have not been determined within example 1. However, given the problem to be solved by the invention, only the fraction below C25 is primarily relevant for practical applications as they are prone to migrate from the packaging material into the product.

The adsorbents according to the invention (4 to 9) adsorbed between 629 and 878 mg MOSH<C 25 per kg of adsorbent, whereas the comparative examples (1 to 3) were able to adsorb 360 to 487 mg MOSH<C 25 per kg. The picture is similar for MOAH<C 25 where the adsorbents according to the invention (4 to 9) were able to bind 35 to 61 mg/kg and the comparative examples (1 to 3) 32 to 35 mg/kg.

Example 2: Performance of the Adsorbents in Paper

Preparation of Paper Sheets

Within example 2 it was shown that the good adsorption rates of the adsorbents on MOSH/MOAH shown in example 1 were maintained after incorporation of the adsorbents into the paper mass. A problem well known within the art is the fact that a component mandatory for paper production (paper fillers with a high specific surface area) often have a high demand for retention aids and thus specific surface and pore volume of the adsorbents may be reduced as pores become clogged by these chemicals. The adsorbents of the invention did not show this problem.

Paper sheets were prepared in a Rapid-Köthen sheetformer applying the following conditions:

Pulp: mixed recycled fibers from a German cardboard mill

Density: diluted with mill white water to 1% solid content

Flocculation agent: Gilufloc 40H (polyaluminiumchloride, BK Giulini, 40% solids)dosage 5 kg telquel/mton pulp Retention aid: Polymin SK (high molecular poly-ethylenimin, BASF, solids 25%) dosage 2 kg dry/mton pulp Adsorbents: dispersed in water at 30% solids; remark: with bentonite only 15% solids could be reached due to high pigment viscosity dosage 10 and 20% on pulp Procedure: For each trial the pulp was freshly prepared with mill white water to a solid content of 1%. Under stirring at 400 rpm the dosage sequence of the chemicals was PAC/adsorbent/retention aid, followed by a stirring time of 1 min after each dosage. Thereafter round sheets of 20 cm diameter were formed on a Rapid-Köthen sheet-former at grammages of 200 g/m2 (between 198 and 202.5 g/m2). The paper sheets were characterized and used for the determination of the MOSH/MOAH adsorption/retention potential. Benchmark sheets were prepared following the same procedure, but without the addition of adsorbents.

Determination of the Paper Weight

The round sheets with 20 cm diameter were dried in a drying cabinet at 110° C. for 2 to 3 minutes and afterwards weighed on an analytical balance.

The paper weight in g/m$^2$ was calculated according to:
Weight of sheet in g/0,1$^2$×πm$^2$ Ash Content Ash content was measured in an incineration tube of Greiner and Gassner GmbH at temperatures up to 1100° C. in pure oxygen atmosphere (incineration time 5 minutes) and was reported in % of the paper mass. The difference in ash content between the paper sheets in which adsorbents are incorporated and the benchmark without adsorbents gives directly the amount of adsorbent retained in the sheets.

Determination of MOSH/MOAH migration

A simple migration cell was used consisting of a stainless steel bottom plate on which a stainless steel ring with an inner diameter of 10 cm, height 1 cm is placed. The cell was covered with another stainless steel plate of the same size as the bottom plate. The paper sheet to be measured (circular with a diameter of 10 cm) was placed on the bottom plate and covered with semolina flour, which was used to mimic the food in contact with the paper. After closure of the cell with the top plate, the cell was covered with the top plate and stored for 5 days at 60° C.

Paper/semolina flour ratio used:
measuring area: π×radius$^2$=3.14×0.5 dm$^2$=0.785 dm$^2$
paper: 200 g/m$^2$=200 g/100 dm$^2$=2 g/dm$^2$
Semolina flour: 8.6 g on 0.785 dm$^2$ corr. to 11 g/dm$^2$ After the storage time the semolina flour was completely transferred into a glass beaker, 250 ml of n-hexane (anhydrous, Sigma-Aldrich) were added and MOSH/MOAH was extracted by shaking the beaker for 2 hours at room temperature. After separation from the semolina flour by filtration, MOSH and MOAH were analyzed following the method of BfR-institute described above. The MOSH/MOAH values were recorded in µg/kg.

Table 3 shows test sheets with a grammage of 200+/−2.5 g/m$^2$. The ash content of the benchmark without addition of an adsorbent was recorded to 25.0%. The dosages of the adsorbents were calculated for incorporation levels of 10 and 20%. As can be taken from table 3 incorporation levels of 7.0 to 7.5% ("dosage 10%") and 13.5 to 14.5% ("dosage 20%") were achieved, which corresponds to good filler retentions around 70%.

TABLE 3

Characterization of the Test Sheet

| Trial no. | Adsorbent | Paper weight g/m$^2$ | Ash content % | Adsorbent incorp. % | Remarks |
|---|---|---|---|---|---|
| 1 | none | 198.3 | 25.0 | — | benchmark |
| 2a | Ca-bentonite | 200.5 | 32.0 | 7.0 | comparison |
| 2b | Ca-bentonite | 201.4 | 38.5 | 13.5 | comparison |
| 3 | Saponite | 202.5 | 39.5 | 14.5 | comparison |
| 4 | Attapulgite | 200.3 | 38.5 | 13.5 | comparison |
| 5 | bentonite acid act. | 202.3 | 39.0 | 14.0 | |
| 6a | nat. silica | 199.5 | 32.0 | 7.0 | |
| 6b | nat. silica | 201.0 | 39.0 | 14.0 | |
| 7 | Sepiolite | 201.6 | 38.5 | 13.5 | |
| 8 | Sep. acid act. | 198.8 | 39.0 | 14.0 | |
| 9a | Saponite/Kerolite mixed layer | 201.2 | 32.5 | 7.5 | |
| 9b | Saponite/Kerolite mixed layer | 202.3 | 39.5 | 14.5 | |
| 10 | Al-silicate synth. | 200.8 | 39.0 | 14.0 | |

Table 4 gives a summary of the effect of the adsorbents on the migration of MOSH and MOAH from the recycled paper into the semolina flour. In the benchmark trial (no. 1) 80 µg/g of MOSH and 27 µg/g of MOAH, together 107 µg/g were detected after the storage time. Incorporation of adsorbents reduces the migration of MOSH and MOAH by adsorption and fixation.

TABLE 4

Migration of MOSH/MOAH

| Trial no. | Adsorbent | Adsorbent incorp. % | MOSH µg/g <C25 | MOSH µg/g C 25-C35 | MOAH µg/g <C25 | MOAH µg/g C 25-C35 | Total µg/g | Reduction % |
|---|---|---|---|---|---|---|---|---|
| 1 | none | — | 57 | 23 | 19 | 8 | 107 | 0 |
| 2a | Ca-bentonite | 7.0 | 34 | 14 | 18 | 8 | 74 | 31 |
| 2b | Ca-bentonite | 13.5 | 25 | 12 | 11 | 4 | 52 | 51 |
| 3 | Saponite | 14.5 | 25 | 8 | 4 | 5 | 42 | 61 |
| 4 | Attapulgite | 13.5 | 24 | 10 | 5 | 5 | 44 | 59 |
| 5 | Bentonite, acid act. | 14.0 | 4 | 3 | 1 | 4 | 12 | 89 |
| 6a | nat. silica | 7.0 | 36 | 7 | 18 | 6 | 67 | 37 |
| 6b | nat. silica | 14.0 | 11 | 3 | 1 | 4 | 19 | 82 |
| 7 | Sepiolite | 13.5 | 8 | 2 | 1 | 3 | 14 | 87 |
| 8 | sep. acid act. | 14.0 | 3 | 2 | 1 | 2 | 8 | 93 |
| 9a | Saponite/Kerolite mixed layer | 7.5 | 16 | 4 | 3 | 2 | 25 | 77 |
| 9b | Saponite/Kerolite mixed layer | 14.5 | 0.5 | 3 | 0.5 | 4 | 8 | 93 |
| 10 | Al-silicate synth. | 14.0 | 7 | 3 | 3 | 2 | 15 | 86 |

As a high incorporation rate (more than 20%) of adsorbents with a high specific surface area would damage the paper strength and/or will demand very high use of chemicals (retention aids, sizing agents), it is a particular advantage of the adsorbents of the present invention that a significant reduction (MOSH & MOAH migration, all fractions) of up to 93% could be achieved at an incorporation rate of 14.5%, 77% at 7.5% respectively.

The invention claimed is:

1. Adsorbent suitable for adsorption of mineral oil aromatic hydrocarbon (MOAH) and/or mineral oil saturated hydrocarbon (MOSH) compounds, the adsorbent characterized by
   (i) a specific surface area of from 140 to 700 $m^2/g$; and
   (ii) a pore volume of pores from 20 to 500 Å of from 0.1 to 1.2 ml/g; and
   (iii) a total pore volume of from 0.25 to 1.2 ml/g.

2. Adsorbent according to claim 1, further characterized by a wet sieve residue of from 90 to 100% less than 53 μm.

3. Adsorbent according to claim 1, characterized by a water content of from 5 to 30 wt %.

4. Adsorbent according to claim 1, characterized by a swelling capacity of less than 15 ml/2 g.

5. Adsorbent according to claim 1, which is selected from the group consisting of bentonites, attapulgites, saponites, sepiolites, mixed layer saponites/kerolites, natural and synthetic aluminum silicates and mixtures thereof.

6. Adsorbent according to claim 1, wherein the adsorbent is an acid-activated adsorbent.

7. Packaging material comprising at least one adsorbent according to claim 1.

8. Packaging material according to claim 7 comprising at least one component selected from paper and cardboard material.

9. Packaging material according to claim 7, comprising at least two layers of cardboard material and/or paper.

10. Packaging material according to claim 9, wherein at least one of the layers comprises at least one adsorbent as defined in claim 1 and at least one layer comprising recycled paper or cardboard material.

11. Container comprising the packaging material according to claim 7.

12. Container according to claim 11, wherein the at least one layer of the packaging material comprising the at least one adsorbent is positioned between the inside of the container and the at least one layer comprising the recycled paper and/or cardboard material.

13. Process for the production of a packaging material comprising the steps
    (a) providing a slurry of fibrous material and water;
    (b) adding to the slurry from 1 to 25 wt % of at least one adsorbent according to claim 1;
    (c) draining the slurry; and
    (d) drying the drained slurry.

14. Process according to claim 13, wherein the at least one adsorbent is added in form of a slurry with a solid content of from 15 to 35 wt % at a Brookfield-viscosity at 100 rpm of 1000 mPas.

* * * * *